(No Model.)
J. J. MOSS.
EXPANSION JOINT.
No. 258,794. Patented May 30, 1882.
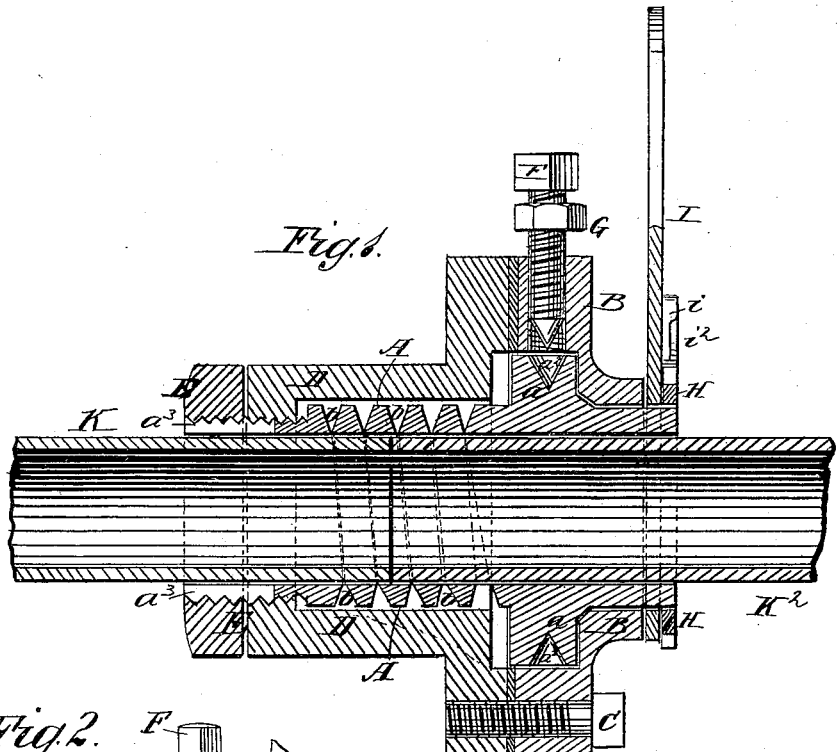
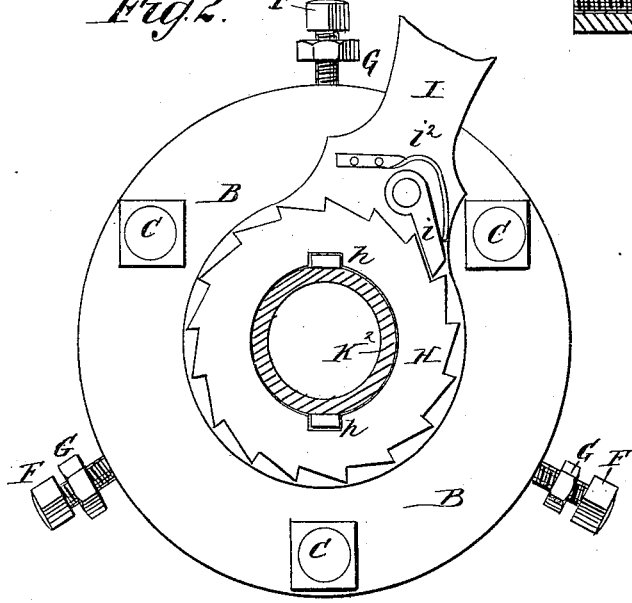
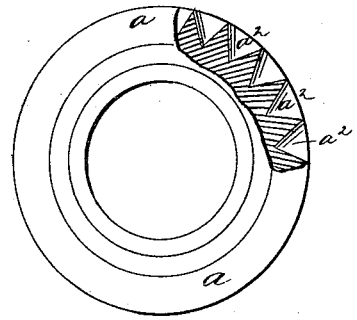
WITNESSES:
Francis McArdle
C. Sedgwick
INVENTOR:
J. J. Moss
BY Munn & Co
ATTORNEYS.

UNITED STATES PATENT OFFICE.

JOHN J. MOSS, OF CHICAGO, ILLINOIS.

EXPANSION-JOINT.

SPECIFICATION forming part of Letters Patent No. 258,794, dated May 30, 1882.

Application filed February 10, 1882. (No model.)

*To all whom it may concern:*

Be it known that I, JOHN J. MOSS, of Chicago, in the county of Cook and State of Illinois, have invented a new and Improved Expansion-Joint, of which the following is a full, clear, and exact description.

My invention relates to devices for joining the ends of tubes in such a manner as to render the joint air-tight and water-tight, while it permits expansion and contraction of the tubes.

The invention consists in a novel construction, arrangement, and combination of a tube having its middle part formed into a spiral, a suitable case or covering for the same, and devices for tightening and loosening the joint and for other purposes, as hereinafter more particularly described.

Reference is to be had to the accompanying drawings, forming part of this specification, in which similar letters of reference indicate corresponding parts in all the figures.

Figure 1 is a central longitudinal section of my invention. Fig. 2 is a front end view. Fig. 3 is a detail view, partly in section.

A is a tube slightly larger in its internal diameter than the external diameter of the pipes K K$^2$ which are to be joined. It fits over the ends of the said pipes after the manner of a sleeve formerly used for such purposes. The inner end is screw-threaded, and when in use is screwed into a socket in the back part of the case D. The said inner end of the tube A has longitudinal compression-slots $a^3$, hereinafter referred to. The middle portion of the tube A is formed into a spiral by cutting a helical V-shaped groove, $b$, entirely through the walls of the tube A, as shown in Fig. 1. This part of the tube forms the joint proper. It will be observed that if the screw-thread in the end be right-handed the groove or thread $b$ must be cut left-handed, and vice versa. Otherwise, when the joint is tightened, by rotating one end of the tube A, as hereinafter described, the said tube would be unscrewed. Upon the front part of the tube A is formed a collar, $a$. This collar has a number of conical recesses, $a^2$, countersunk into its circumference, preferably close together, for the purpose hereinafter described.

To the extreme front end of the tube A is keyed a ratchet-wheel, H, and turning on said tube A, behind the ratchet-wheel H, is a lever, I, carrying a pawl, $i$, and spring $i^2$.

The front part, B, of the case conforms internally to the shape of the forward part of the tube A. It is provided with radial set-screws, F, having their ends tapering for engagement with the recesses $a^2$ of the collar $a$. These set-screws are provided with set-nuts G. The parts B and D are secured together by screws or bolts C. The back part, D, of the case forms the socket for the rear end of the tube A.

E is a nut, which is screwed on the end of the tube A, over the compression-slots $a^3$. It is tapered internally, and when it is screwed on the slotted end of the tube A it compresses that part of the tube A and causes it to grip the pipe K firmly.

The operation of my invention is as follows: The end of one of the pipes, K, is inserted through the rear end of the tube A and brought to about the middle of the spiral of the pipe A. The nut E is then screwed on and holds the said pipe firmly in place. The second pipe, K$^2$, is then inserted in the front end of the tube A, and if the pipes are warm, the end of the pipe K$^2$ is brought into contact with the end of the pipe K. If the pipes are cold a short space should be left between the pipes K and K$^2$ for expansion. The front end of the tube A is then rotated, so as to tighten the spiral and cause the ends of the pipe to be firmly held. The set-screw F and the recesses $a^2$ in the circumference of the collar $a$ are so arranged with reference to each other that when any one of the set-screws F is squarely and fully engaged with any one of the recesses $a^2$ the point of one of the other set-screws F is just entering one of the other recesses, so that if the second screw be screwed down while the first is raised the tube A will be gradually rotated. By the time that the second screw is fully engaged with a recess the first will be just leaving one, but the third will be entering on another. This method is very delicate and accurate; but the tube A may be rotated more rapidly by the lever I, pawl $i$, and ratchet-wheel H, and when the desired adjustment is arrived at the tube is secured by screwing down one of the set-screws F.

The advantage of my invention is, that while the joint is tight enough to prevent the contents of the pipes from escaping, it is, when properly adjusted, loose enough to permit the pipes to expand and contract by heat and cold; and, further, the pressure can be adjusted at any time for this purpose. Another advantage is that as the pipe K is firmly and immovably held by the nut E, there is no possibility of the joint being displaced by the alternate expansions and contractions of the pipes.

I do not confine myself to the use of my invention as and for an expansion joint or coupling for pipes, but it will be useful in any combination requiring an adjustable fitting or packing, as in steam-cylinder glands and other machinery. In case of its use in a steam-cylinder, the nut E would be removed and the case B D secured to the cylinder-head. The piston-rod would pass through the tube A, which would be adjusted as required, and used in lieu of packing.

Having thus fully described my invention, I claim as new and desire to secure by Letters Patent—

1. The combination of the tube A, having spiral middle-recessed collar $a$ $a^2$, and longitudinal compression-slots $a^3$, with the case D, the nut E, and the screw F, as and for the purpose specified.

2. The combination, with a tube, A, constructed as above described and provided with a collar, $a$, having recesses $a^2$, of the case B D, provided with set-screws F, arranged with reference to said recesses, substantially as and for the purpose herein described.

JOHN J. MOSS.

Witnesses:
ABRAHAM OUTRAM,
WALTER BASTAHLE.